(12) United States Patent
Osman et al.

(10) Patent No.: US 11,232,314 B2
(45) Date of Patent: Jan. 25, 2022

(54) COMPUTER VISION BASED APPROACH TO IMAGE INJECTION DETECTION

(71) Applicant: SERELAY LIMITED, Didcot (GB)

(72) Inventors: Aadam Osman, Cape Town (SA); Clinton Montague, Reading (GB)

(73) Assignee: Serelay Limited

( * ) Notice: Subject to any disclaimer, the term of this patent is extended or adjusted under 35 U.S.C. 154(b) by 50 days.

(21) Appl. No.: 16/823,382

(22) Filed: Mar. 19, 2020

(65) Prior Publication Data

US 2021/0295075 A1     Sep. 23, 2021

(51) Int. Cl.
*G06K 9/00* (2006.01)
*G06K 9/46* (2006.01)
*G06K 9/62* (2006.01)

(52) U.S. Cl.
CPC ....... *G06K 9/00899* (2013.01); *G06K 9/4642* (2013.01); *G06K 9/4652* (2013.01); *G06K 9/6212* (2013.01); *G06K 9/6268* (2013.01)

(58) Field of Classification Search
CPC ............ G06K 9/00899; G06K 9/4642; G06K 9/6212; G06K 9/6268; G06K 9/4652
USPC ........................................................ 382/165
See application file for complete search history.

(56) References Cited

U.S. PATENT DOCUMENTS

| | | | |
|---|---|---|---|
| 2007/0113099 A1* | 5/2007 | Takikawa | G06K 9/00221 713/186 |
| 2008/0063243 A1* | 3/2008 | Kiyomizu | G06K 9/00013 382/115 |
| 2015/0020181 A1* | 1/2015 | Iwata | G06K 9/4652 726/7 |
| 2018/0078123 A1* | 3/2018 | Seki | G06T 7/55 |
| 2021/0082136 A1* | 3/2021 | Nikitidis | G06K 9/6256 |

* cited by examiner

*Primary Examiner* — Ayodeji O Ayotunde
(74) *Attorney, Agent, or Firm* — Fresh IP PLC; Clifford D. Hyra; Aubrey Y. Chen

(57) ABSTRACT

A computer implemented method for image verification comprises receiving, by a processor, a plurality of image frames, comprising at least one test frame and one or more control frames; mapping, by the processor, each image frame onto a hue-saturation colour space; generating, based on the mapped image frames, a colour distribution for each image frame; calculating, by the processor, a correlation between the colour distributions generated for the at least one test frame and the one or more control frames; and generating, by the processor for output to a user, a verification output based on the calculated correlation.

20 Claims, 8 Drawing Sheets

D5212E  #C6221  #8D0101  #680101

COMPUTER VISION BASED APPROACH TO IMAGE INJECTION DETECTION

FIELD OF THE INVENTION

The present invention relates to the field of image verification and, in particular, to the capture and verification of images using, for example, a mobile communications device.

BACKGROUND

Consumer devices which capture data from their physical surroundings are now ubiquitous. For example, most modern mobile telephones include a camera for capturing both stills and video, and a microphone for capturing sound recordings, either as a sound channel to a video recording or a separate sound recording.

Special-purpose devices are also increasingly common, for example dashboard-mounted cameras designed to record the view out of a vehicle windscreen to provide evidence in case of an accident, and body-worn cameras used by police to evidence their interactions with the public.

News organisations often receive submitted photographs and videos from members of the public, but these organisations have to be careful to verify the authenticity of what they are being presented with—in particular that the photograph (for example) is a direct unaltered capture from a camera and that it was taken at the time and place claimed. In the past, even reputable news organisations have fallen victim to falsified submitted photographs and published then as genuine.

Proving that a particular photograph is a direct and unaltered capture from a camera on a particular device, made at a particular time and in a particular geographical position, could be invaluable in a variety of circumstances—for example when relying on photographs to support an insurance claim.

Known devices often not only record primary data, for example photographs or video, but also record metadata relating to the capture and, in some systems, the integrity of data captured by a consumer electronic device may be verified based on such metadata, in particular to verify that primary data is unaltered and truly corresponds to particular metadata. However, such devices may still be vulnerable to so-called 'injection attacks'.

For example, a false or 'spoofed' image frame, such as a computer generated or computer manipulated image, can be injected directly into the frame buffer of a camera. Since the image enters the system prior to image processing and metadata generation, the spoofed image frame is processed and recorded with metadata as a real image frame, and is indistinguishable from a real image frame.

Methods of detecting such injection attacks have been proposed using, for example, pixel velocity tracking, but a generally computationally expensive and are unsuitable for real-time execution, e.g., in a mobile device with limited computation resources. Furthermore, many solutions rely on correlating spatial information within the image frame, but for security and privacy reasons it is desirable that any such reconstructive image data is not accessible through the system backend.

It is an object of the present invention to provide means by which captured image frames can be verified, in order to counter such 'injection attacks'.

SUMMARY

The present disclosure describes techniques, methods, systems, and other mechanisms for verification of a captured image.

According to a first aspect of the present invention, a computer-implemented method of image verification is provided including receiving, by a processor, a plurality of image frames, including at least one test frame and one or more control frames; mapping, by the processor, each image frame onto a hue-saturation colour space; generating, based on the mapped image frames, a colour distribution for each image frame; calculating, by the processor, a correlation between the colour distributions generated for the at least one test frame and the one or more control frames; and generating, by the processor for output to a user, a verification output based on the calculated correlation.

The colour distribution may be a colour distribution histogram; The method may include converting, by the processor, each image frame into a 1 dimensional pixel stream.

The at least one control frame may include at least one lead frame preceding the test frame and at least one post frame following the test frame.

The at least one control frame may include four or more lead frames preceding the test frame and four or more post frames following the test frame.

The method may include applying, by the processor, an L2 normalisation to each of the colour distribution histograms.

The correlation may include at least one of a zero-normalised cross-correlation, a Chisquared statistic correlation, an intersection correlation, and a Bhattacharyya distance.

The correlation may be based on a cost function including a weighted combination of two or more of the zero-normalised cross-correlation, Chi-squared statistic correlation, intersection correlation, and Bhattacharyya distance.

The verification output may be generated based on a comparison of a first correlation, between the test frame and an immediately preceding control frame, and a second correlation, between the test frame and an immediately following control frame.

Generating the verification output may include determining, based on the comparison, whether the test frame is classified as matched or spoofed; and generating, for output to the user, a classification for the test frame.

The determination may be based on a value of the comparison exceeding a predetermined threshold.

The predetermined threshold may be 0.1.

According to a second aspect of the present invention, an image capture apparatus is provided including an image capture module configured to generate one or more image frames; and a verification module comprising a processor configured to execute the method of the first aspect.

According to a third aspect of the present invention, a mobile device is provided including the image capture apparatus of the second aspect.

According to a fourth aspect of the present invention, a computer-readable medium is provided storing instructions which, when executed by a processor, cause the processor to perform the method of the first aspect.

BRIEF DESCRIPTION OF DRAWINGS

The details of one or more examples of the disclosure are set forth in the accompanying drawings and the description below. Other features, objects and advantages will be apparent from the description and drawings, and from the claims.

Like reference symbols in the various drawings indicate like elements.

DETAILED DESCRIPTION

The present invention relates to an image processing apparatus and method for capturing an image and verifying a captured image. In particular, an image captured by a device, such as a mobile communication device, can be analysed to provide a verification output indicating whether or not the image is a false, or 'spoofed', image.

Figure 1:
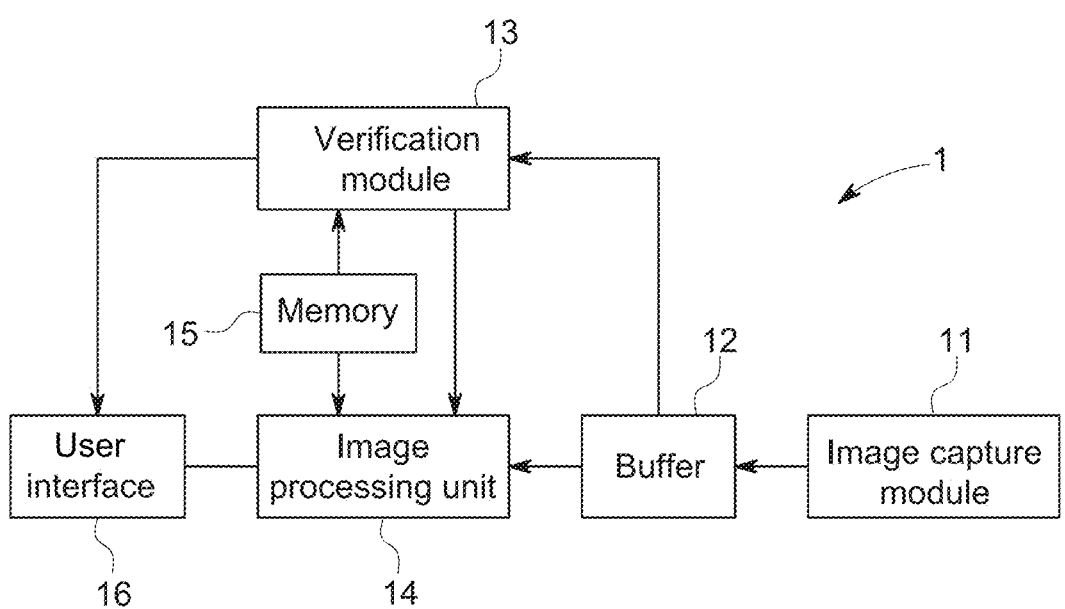
FIG. 1 is a block diagram illustrating an example device for capturing and verifying an image, in accordance with one or more techniques of the present disclosure.

FIG. 1 shows a block diagram of an image processing apparatus 1 according to an embodiment of the present invention. The image processing apparatus 1 comprises an image capture module 11, an image buffer 12, a verification module 13, an image processing unit 14, a memory 15 and a user interface 16.

The image capture module 11 is configured to generate and output an image frame corresponding to a real-world scene. The image capture module 11 may be referred to as a camera or camera module. In some embodiments, the image capture module 11 may be an external component of the image processing apparatus 1 or may be connected as a modular part. According to an embodiment, the image capture module 11 comprises an aperture to receive light and an image sensor configured to generate an image signal in response to incoming light, for example, a CCD. The image sensor may be formed as a two-dimensional array of image pixels. The image capture module 11 may comprise one or more lenses to focus incoming light.

The image capture module 11 may comprise a sensor controller for controlling the generation and output of an image signal. The sensor controller may operate as a virtual shutter to control the collection of light and generation of an image signal. The sensor controller may refresh each image pixel of the image sensor and collect a signal from the pixel after a predetermined time. The image signal may be generated from the plurality of signals collected from the image pixels. In some embodiments, the sensor controller may operate with a predetermined refresh rate, where the pixels of the image sensor are refreshed and a new image signal is generated periodically at the predetermined rate. In some embodiments, a physical shutter may be implemented to control the image sensor, and may be operated to open and close at a predetermined rate.

The image capture module 11 may generate and output an image stream comprising a plurality of image frames. The image stream may be generated in accordance with the predetermined refresh rate. The image capture module 11 is configured to output the image frame to the image buffer 12.

The image buffer 12 comprises a storage or memory configured to store a plurality of image frames. According to an embodiment, the image buffer 12 is a volatile memory. The image buffer 12 receives the plurality of image frames from the image capture module 11 and stores each of the received image frames. The image buffer 12 may be configured to store each received image frame until the memory is full. The image buffer 12 may be configured to delete or overwrite stored image frames as additional new image frames are received from the image capture module 11. The image buffer 12 may be configured with a first-in-first-out (FIFO) scheme where the earliest stored image from is overwritten by a new incoming image frame. In this way, a fixed number of image frames is generally stored in the image buffer 12 at a given time.

The image buffer 12 is connected with the image processing unit 14. The image processing unit 14 is configured to execute an image capturing process, as described below. The image processing unit 14 is configured to read one or more image frames from the image buffer 12, to perform one or more image processing tasks, to save one or more image frames in the memory 15 and to output one or more image frames to the user interface 16. The image processing unit 14 may also be configured to execute an electronic viewfinder process, as described below.

The memory 15 is configured to store one or more image frames captured by the image capture module 11. The memory 15 may be a non-volatile storage. For example, the memory 15 may be a hard disc drive or a solid state drive. The memory 15 is connected with the image processing unit 14 and the verification unit. The memory 15 may contain instructions for execution by the image processing unit 14. For example, the memory 15 may contain instructions for executing the electronic viewfinder process and the image capturing process. The memory 15 may contain instructions for execution by the verification module 13, e.g., to perform a verification process. In some embodiments, a second memory may be provided for the storage of these instructions.

According to the electronic viewfinder process, the image processing unit 14 reads an image frame from the image buffer 12. The image processing unit 14 may read the most recently stored image frame in the image buffer 12. The image processing unit 14 may perform at least one image processing task. For example, the image processing unit 14 may perform a scaling task to increase or decrease a resolution of the image frame, or a colour correction task to adjust a colour of the image frame. The image processing unit 14 sends the image frame to the user interface 16 for output to the user. The image processing unit 14 reads each image frame from the image buffer 12 and sends each image frame to the user input is sequence, such that the image stream is output directly to the user. Alternatively, the image processing unit 14 reads a subset of the image frames, e.g., every other frame.

According to the image capturing process, the verification module 13 reads an image frame from the image buffer 12. The verification module 13 may read the most recently stored image frame in the image buffer 12. Alternatively, the verification module 13 may read an earlier image frame from the image buffer 12. Alternatively, the verification module 13 may read a plurality of image frames from the image buffer 12. The verification module 13 performs a verification process on the one or more image frames, as described in more detail below. The verification module 13 provides a verification output to the user interface 16 for output to the user. The verification module 13 provides the one or more image frames to the image processing unit 14.

The image processing unit 14 receives the one or more image frames from the verification module 13. In some embodiments, the image processing unit 14 may select an image frame from a plurality of available image frames based for, e.g., an amount of motion blur determined in each image frame. The image processing unit 14 may perform at least one image processing task. For example, the image processing unit 14 may perform the scaling task or the colour correction task. In some embodiments, the image processing unit 14 may perform an image combination task, to combine a plurality of received image frames into a combined image. The image processing unit 14 sends the processed image frame to the memory 15 for storage. The image processing unit 14 may also send the processed image frame to the user interface 16 for output to the user. In some embodiments, the image processing unit 14 may perform a first set of tasks to generate a first image for output to the user and may perform a second set of tasks to generate a second image for storage in the memory 15.

Figure 2:
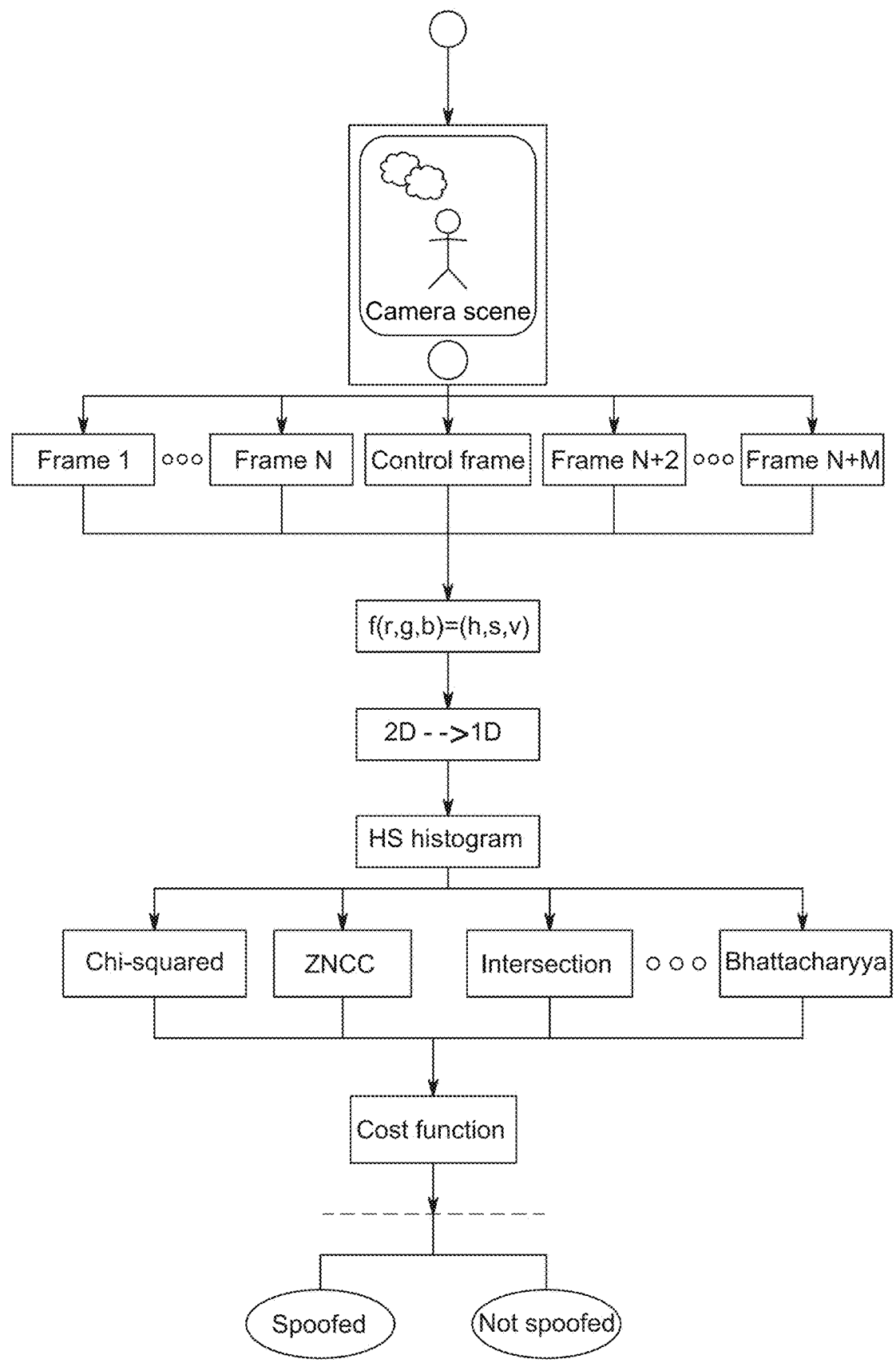
FIG. 2 is a process flow diagram illustrating an example operation for capturing and verifying an image, in accordance with one or more techniques of the present disclosure.

FIG. 2 shows the image verification process in more detail, according to an embodiment. The image verification module 13 receives a plurality of image frames each showing a camera scene. The image frames may comprise a control frame and one or more test frames. The image verification module 13 performs a colour mapping on the plurality of image frames. The colour mapping converts the image frames from a first colour space to a second colour space. For example, the image frames may be converted from a red-green-blue (RGB) colour space to a hue-saturation (HS) colour space.

RGB is the predominant color space used in many electronic devices, as opposed to others like hue-saturation-value (HSV) or hue-saturation-lightness (HSL). However, a captured image stream is exposed to an amount of external noise. For example, planar, depth and light variation are a few examples of noise samples. Light variation may be the most predominant factor. Depth may also be somewhat dependent on light, and may be filtered simultaneously.

Figure 3:
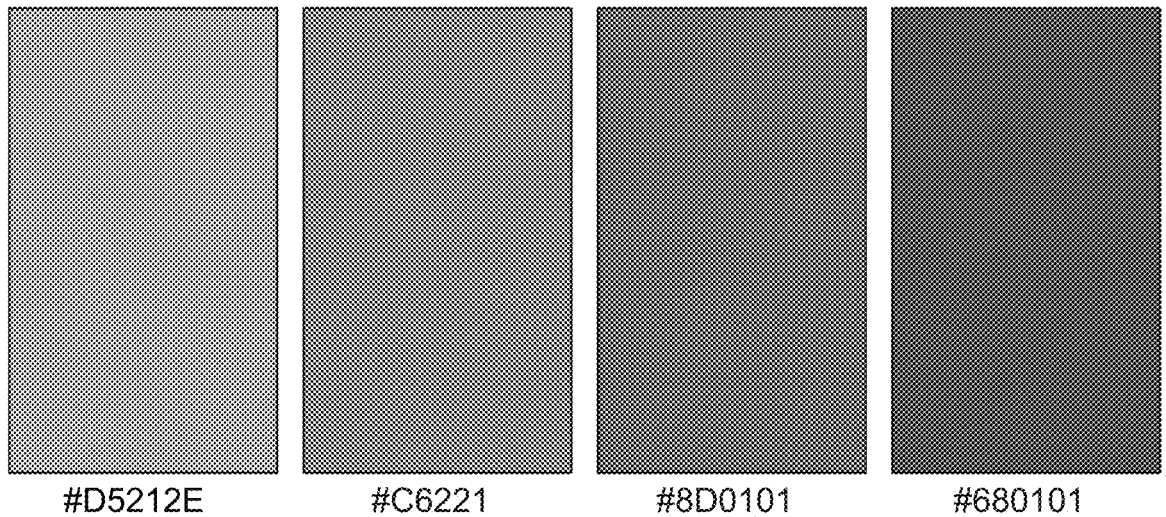
FIG. 3 is an illustration showing an example colour palette.

Light variation can be illustrated in FIG. 3. A red colour space is shown, which represents a red object under different light intensities. Although the red is unchanged, the captured image frames have different RGB values, through RGB colour mixing. Since the image verification module 13 is dependent on raw pixel information from the image capture module 11, the RGB colour space may affect the verification process. For example, we may want to classify the images of FIG. 3 as spoofed, based on the differing RGB values.

HSV is a cylindrical colour space. Hue is represented by an angle ($[0 \to 2\pi]$) in the hue space. An RGB pixel of ($[0 \to 255], [0 \to 255], [0 \to 255]$) is transformed by the relationship:

Red: $0° \to 60°$
Green: $121° \to 180°$
Blue $241° \to 300°$

Saturation describes the amount of gray in a particular colour, from 0 to 100 percent. This type of information may be valuable in identifying images taken by different cameras, or under different internal parameter settings. This may be used as a factor in classifying a spoofed image.

Value works in conjunction with saturation and describes the brightness or intensity of the color, from 0-100%, where 0% is dark, while a 100% is the brightest and reveals the most colour. In other words, this captures light information about a given scene. By separating Value in this way, it is possible to isolate the light noise described above and, as such, Value is not considered in the image verification process.

In some embodiments, the image verification module 13 converts the image frames from RGB to HSV or HSL, and then discards the value or lightness. Alternatively, the hue and saturation may be calculated directly to convert to the HS colour space. By moving from RGB to the HS colour space, the image verification module 13 can remove light distortion, in order to mitigate a potential high false positive rate.

Figure 4:
FIG. 4 is an illustration showing an image frame conversion operation.

The verification module 13 converts each mapped image frame from a two-dimension image to a one-dimensional pixel stream. As shown in FIG. 4, each row of the image frame may be concatenated in sequence onto the pixel stream. Alternatively, the pixel stream may be formed by aligning columns of the image frame in sequence. By reducing the dimensionality of the data at this stage, the image verification module 13 can reduce the computational cost of the following processing steps, as will be described.

The verification module 13 generates a colour distribution from the one-dimensional pixel stream for each image. According to an embodiment, an HS histogram may be generated. The HS histogram comprises a two-dimensional array of 'bins' corresponding to each value of hue and saturation. Each bin is assigned a 'bin count' based on the number of pixels in the pixel stream that have HS values corresponding to the bin. Given the continuity of the HS space, a nearest neighbour approach may be applied. Bins may be assigned based on the nearest 1° for Hue and 1% for Saturation respectively, to generate a histogram of size 460 bins, i.e. 360 hue bins and 100 saturation bins.

In some embodiments, the histogram distribution, of dimension [1×460], may be L2 normalised. Its transformation is as follows, $$L_2 norm(hist_{HS})_i = \frac{hist_{HS}[i]}{\sum_{i=0}^{459} \{hist_{HS}[i]\}^2}$$

where $hist_{HS}$ is a function of i, and $i \in [0, \ldots, 459]$.

Such histograms are invariant to translation and change slowly under different view angles, scales and in presence of occlusions. In this way, the verification module 13 can create a unique fingerprint corresponding to an image stream of capture image frames under an associated color space. In order to spoof such a fingerprint, it would be necessary to determine the colour distribution of the image stream (that is, the current scene) in real time and to simultaneously process the injected image to match. Such processing is not feasible in real time. As such, with these fingerprints a correlation based approach, or similar methods, may be used to classify the image as (1) Matched or (0) Spoofed. Furthermore, by creating a colour distribution, all spatial-visual information about an image is dropped and reconstruction of the image frame is not possible.

In some examples, generating a colour distribution in this way can be computationally expensive. For example, generating a HS histogram for a single image may require X×Y iterations, where X and Y are the image's dimensions. By first reducing the data to a one-dimensional pixel stream, the verification module 13 can reduce the computational cost of generating a colour distribution.

The verification module 13 calculates a correlation between the colour distributions generated for the image frames. The verification module 13 calculates a correlation between the colour distribution for the control frame and the colour distribution for at least one test frame. The at least one test frame may be at least one preceding test frame. Alternatively, the at least one test frame may be at least one following test frame.

According to an embodiment, a first correlation is calculated between the control frame and one preceding test frame, and a second correlation is calculated between the control frame and one following test frame. According to another embodiment, a plurality of correlations are calculated between the control frame and each of the four preceding test frames and four following test frames.

The verification module 13 calculates a correlation using any suitable correlation or distance measuring method. For example, the correlation method may be one or more of the following:

Zero-Normalised-Cross-Correlation (Variant)
Chi-Squared Statistic
Intersection
Bhattacharyya distance Alternatively, any other suitable correlation method may be used in isolation or in combination with one or more of the above examples.

A Zero-Normalised-Cross Correlation (ZNCC) is a similarity measure of two distribution functions that are relatively displaced from each other. This means that ZNCC is a shift invariant kernel. ZNCC can offer benefits in situations with varied lighting. Instead of using colour data as a hard fact, the shape of a colour distribution is used.

Figure 5A:
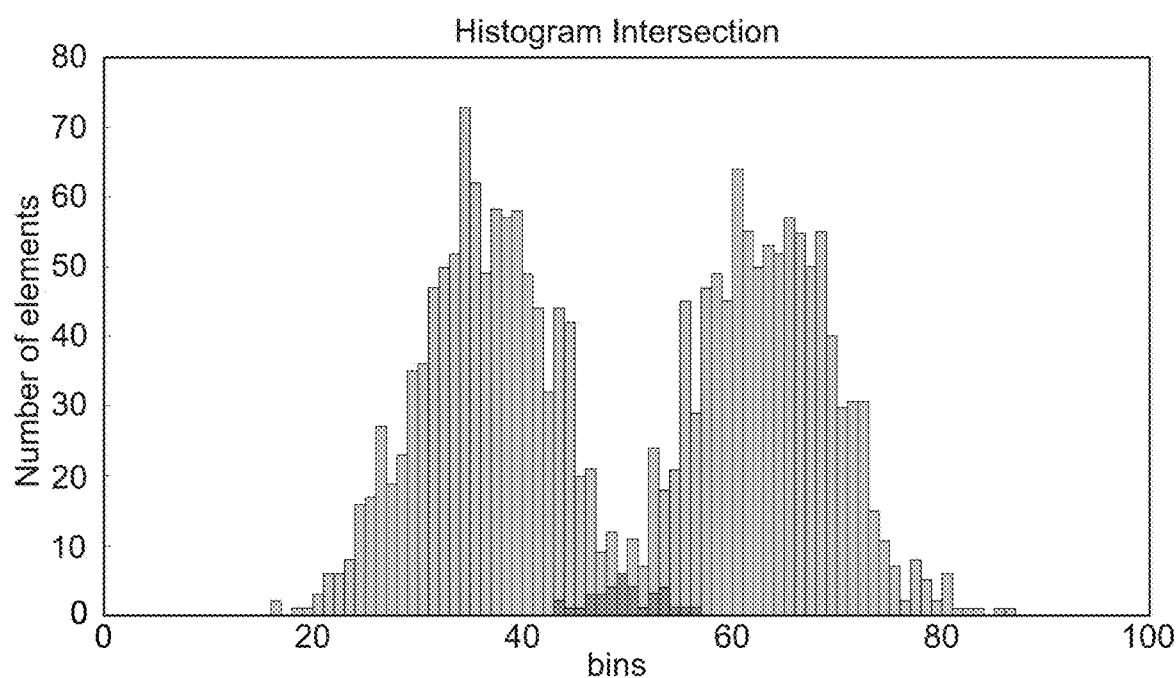
FIGS. 5A and 5B are charts showing exemplary colour distribution histograms.

FIG. 5A shows two distribution functions which tend to peak and trough in a similar pattern. This illustration may represent a scenario when there is uncontrollable variation to global lighting. Even using an HS distribution there is a potential gap for disturbance which needs to be accounted for. Such a scenario may produce two distribution functions of the same shape, but different intensities. ZNCC can provide an improved result in such situations.

Embodiments may implement a variant of ZNCC to match two distribution functions, E1(i) and E2(i) respectively. It is formally defined by, $$ZNCC(E_1, E_2) = \frac{\sum A \cdot B}{N^2 \sqrt{\sum \left\{\left(\frac{1}{N}A\right)^2\right\} \cdot \sum \left\{\left(\frac{1}{N}B\right)^2\right\}}}$$

Such that:

$A = N \cdot E_1 - \Sigma E_1$ $b = N \cdot E_2 - \Sigma E_2$

Where N=460, the correlation metric is ZNCC $(E_1, E_2) \in [0,1]$ and $\in R$. The following relationship:

$ZNCC(E_1, E_2) \propto likelihood_{matched}$

A Chi-Squared statistic is a test that measures how expectations compare to actual observed data. Given two distributions, E1 and E2, the verification module 13 assumes that E1 is an observed expectation. A second assumption may be that E1 and E2 are random, raw, mutually exclusive, drawn from independent variables and from a large enough sample space.

Formally the matched likelihood is determined by, $$CHSQR(E_1 - E_2) = \sum \frac{(E_1 - E_2)^2}{E_1}$$

Such that $CHSQR(E1, E2) \in R$ and, $$CHSQR(E_1, E_2) \propto \frac{1}{likelihood_{matched}}$$

Figure 5B:
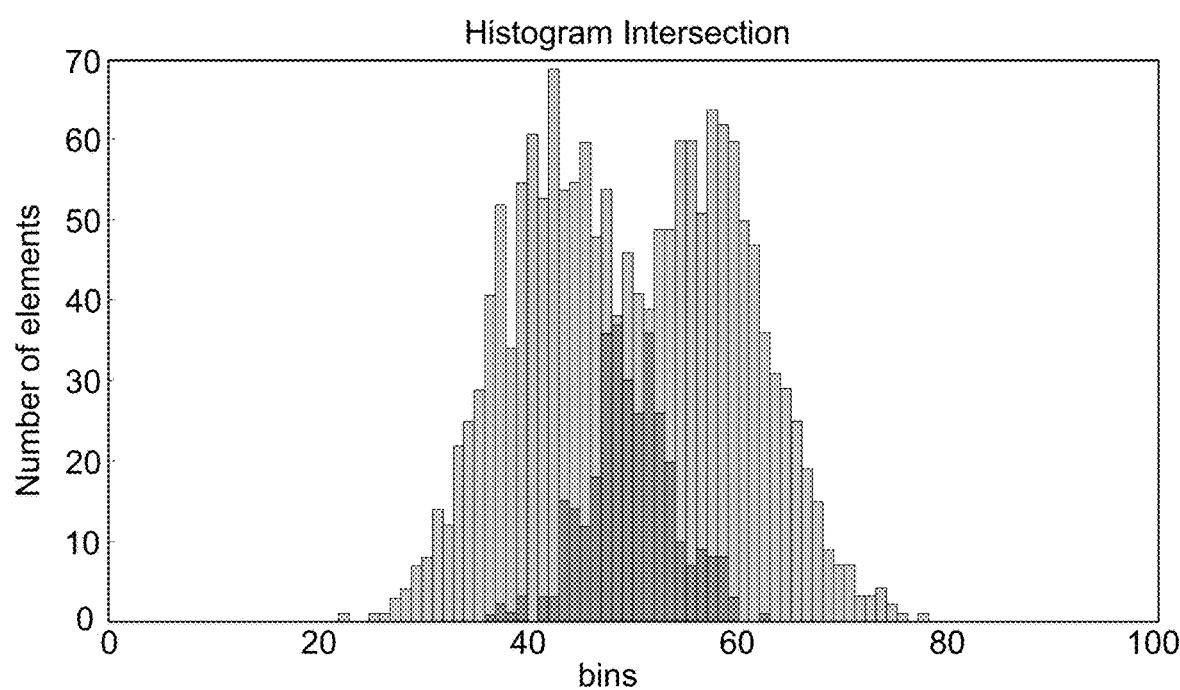
Figure 6A:
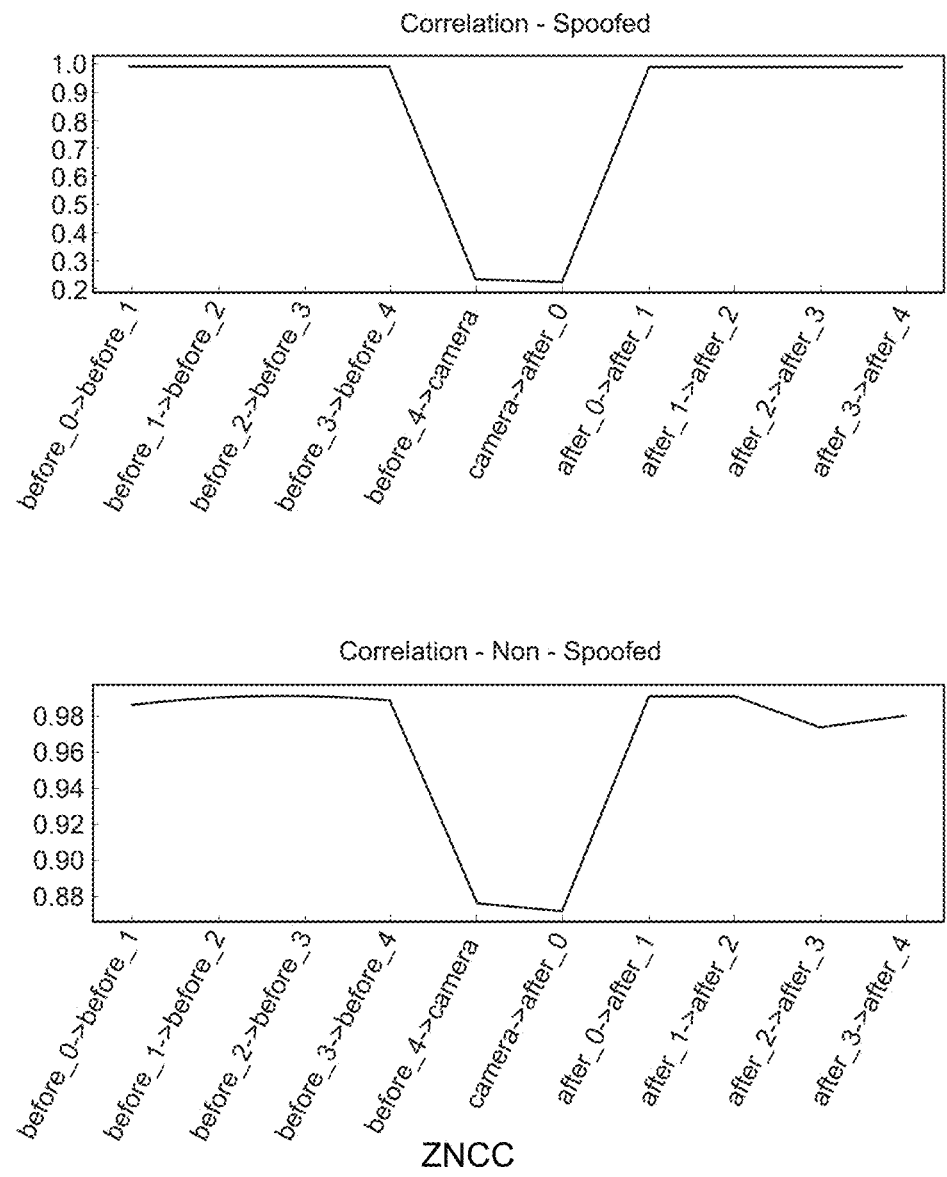
FIG. 6A to 6D are charts showing exemplary frame correlation comparisons.
Figure 6B:
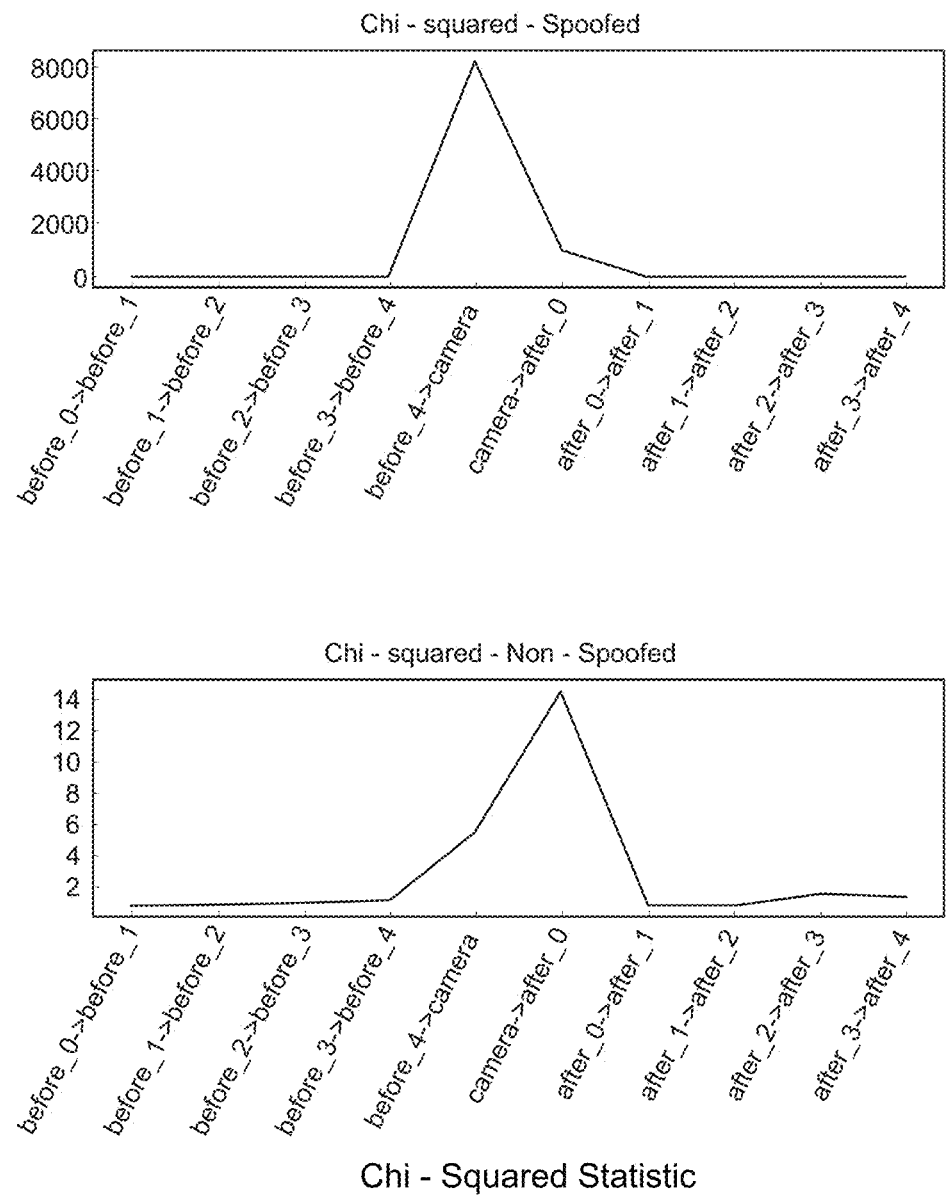
Figure 6C:
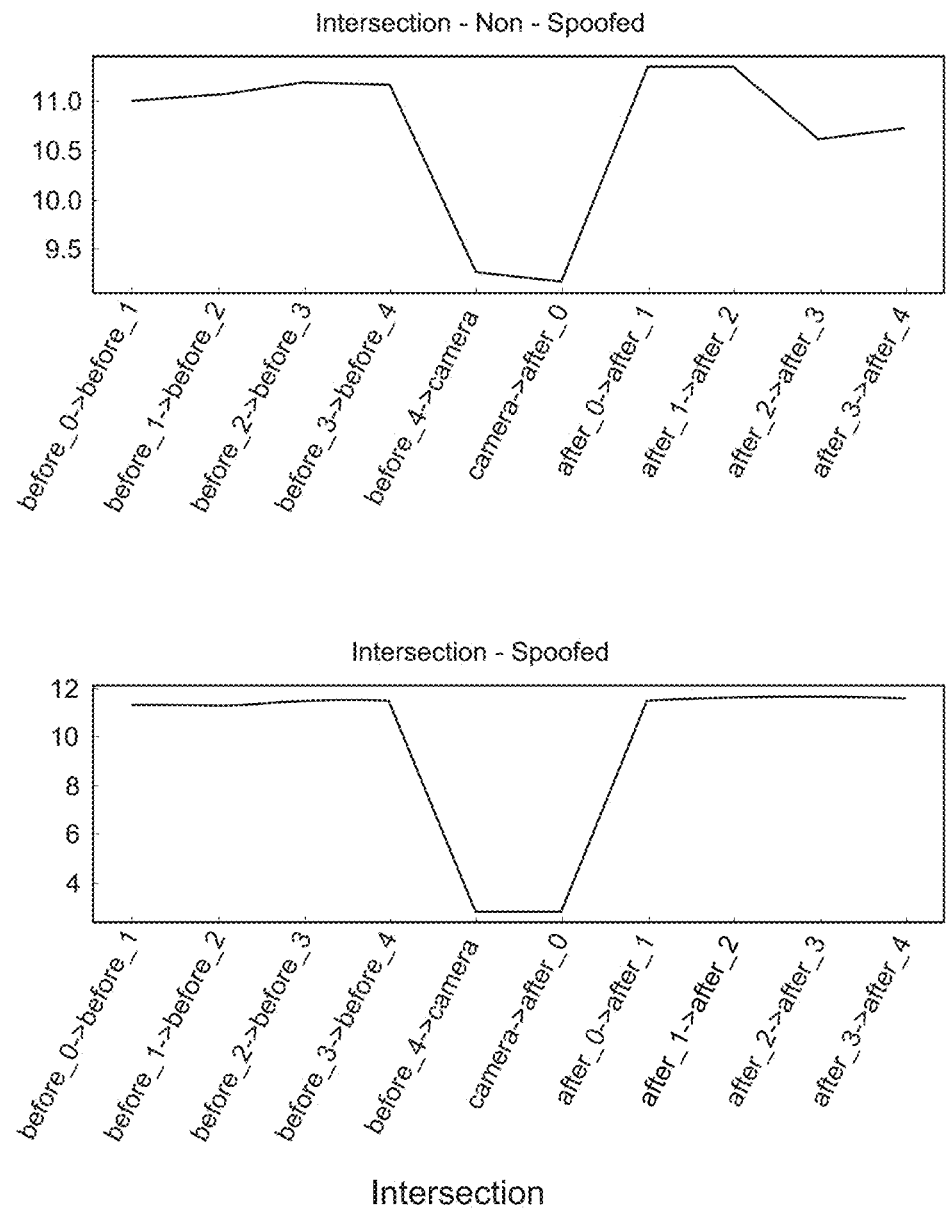
Figure 6D:
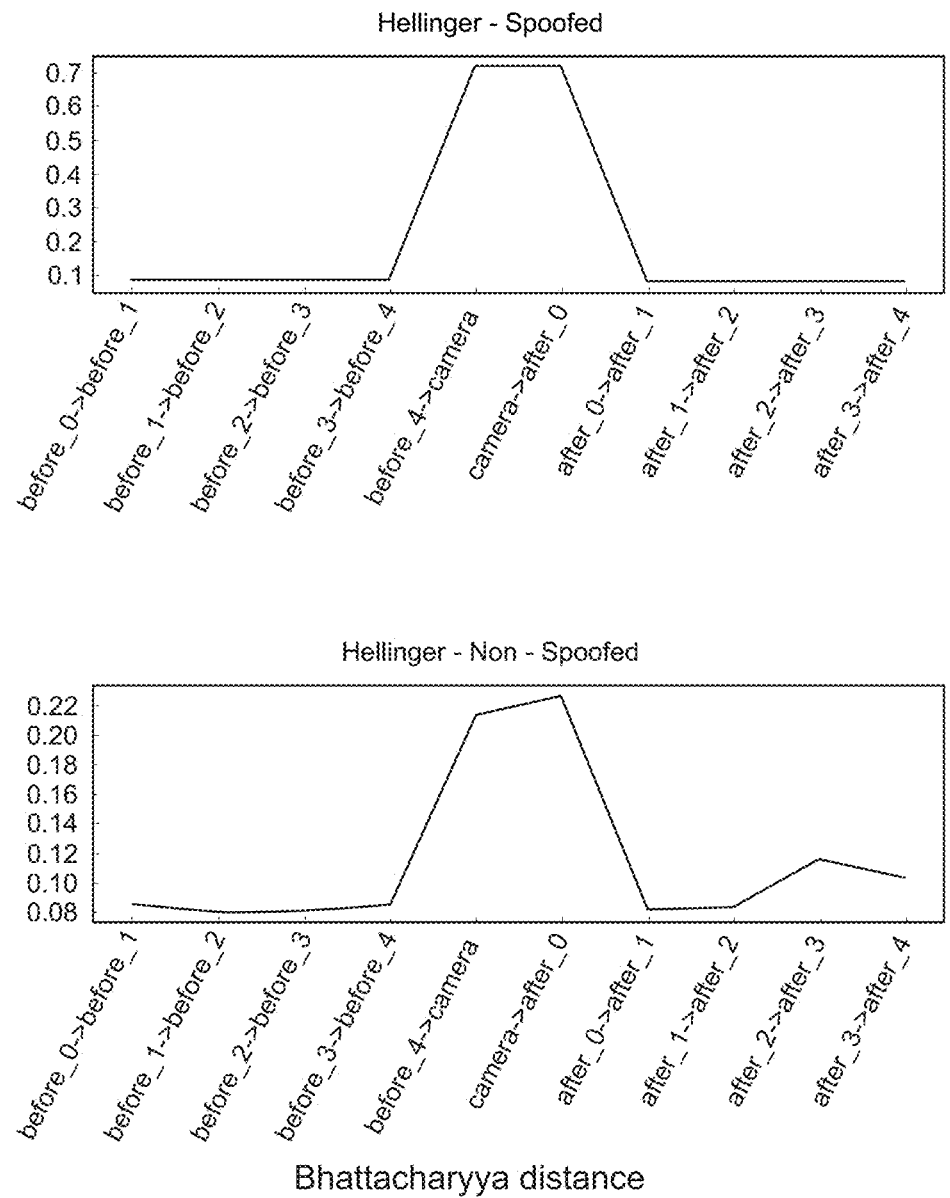

An Intersection correlation based method makes use of a non-linear feature mapping function, min(•). The correlation determines the intersection between two distributions functions. For example, in FIG. 5A, the intersection between the histograms is small compared to FIG. 5B.

Mathematically, the similarity between two frames(E1, E2) may be determined by, $$Inter(E_1, E_2) = \frac{\sum \min(E_1, E_2)}{\sum E_1}$$

if E1 is the referenced distribution, or, $$Inter(E_1, E_2) = \frac{\sum \min(E_1, E_2)}{\sum E_2}$$

if E2 is the referenced distribution. Such that Inter(•, •)$\in R$ and, $Inter(•,•) \propto likelihood_{matched}$ A Bhattacharyya coefficient is a normalised measure of separability, or in other words it is a measurement of the amount of overlap between two statistical samples. Bhattacharyya may be used as a distance measure between two observed functions, E1, E2. With a variant of the form:

$$B(E_1, E_2) = 1 - \sqrt{1 - \frac{1}{\sum(E_1)\sum(E_2)} \sum(A)}$$

Such that:

$A = E_1 \sim E_2$ and B(•,•)$\in [0, 1]$ and $\in R$ Along with its shared relationship, $B(•,•) \propto likelihood_{matched}$ FIG. 6 shows correlation functions as calculated for non-spoofed (left) and spoofed (right) data sets. Correlations are calculated using (a) ZNCC, (b) Chi-Squared Statistic, (c) Intersection and (d) Bhattacharyya distance. As can be seen, each data set consisted of a sequence of test frames, four before and four after capture, and a single control frame. In the spoofed data set, the control frame was spoofed by the addition of an artificial computer-generated object.

It is noted that there is a difference in correlation moving from the fourth preceding test frame to the control frame and again from the control frame to the first following test frame. This difference is present irregardless of spoofed or non-spoofed data. This is because the captured image may require a longer processing time, under different exposures, shutter speeds and white balance. This elapsed time may allow the scene to change and hence change the attributes that the offset correlation encoded. Notably, these parameters change per scene, and so the timing difference between test frames and control frames changes accordingly.

From FIG. 6 it is further noted that the Chi-Squared correlation exhibits a sensitivity to spoofed images. This is seen as a value of 14 moves to 8000 for a non-spoofed and spoofed set respectively, between the last preceding test frame and the control frame. In addition, the Bhattacharyya, Intersection and ZNCC correlations are able to distinguish between spoofed and non-spoofed, with a sensitivity tending towards non-spoofed images.

The verification module 13 integrates the different correlations using a cost function.

As discussed above, the CHSQR correlation may be more sensitive to spoofed images in comparison to the Bhattacharyya and Intersection correlations. The Bhattacharyya and Intersection correlations may be particularly sensitive to non-spoofed images. Given this, the verification module 13 may implement the following cost function:

$$C = CHSQR^2 - B^2 - Inter^2$$

In alternative embodiments, any of the following cost functions may be implemented:
Summed Squares:

$$C = B^2 + CHSQR^2 + Inter^2$$

Summed Exponential:

$$C = e^{-B} + e^{-CHSQR} + e^{-Inter}$$

Summed Savage:

$$C = \frac{1}{(1+e^B)^2} + \frac{1}{(1+e^{CHSQR})^2} + \frac{1}{(1+e^{Inter})^2}$$

Summed Tangent:

$$C = (2 \arctan(B)-1)^2 + (2 \arctan(CHSQR)-1)^2 + (2 \arctan(Inter)-1)^2$$

The verification module 13 may classify the correlations using a threshold. For example, based on the above described cost function a threshold, TH, of 0.1 may be defined. In this way:

$$\delta(C) = \begin{cases} 1, & \text{if } C \leq 0.1 \\ 0, & \text{else} \end{cases}$$

Such that $\delta$ is the classification function. In this way, returning to FIG. 2, the verification module 13 outputs a classification based on the calculated cost function. According to an embodiment, the classification has a value of 0 or 1 as described above, where 0 indicates a "spoofed" image frame, and 1 indicates a "matched" or "non-spoofed" image frame. In some embodiments the verification module 13 may output the correlation value directly or, alternatively, the correlation value may be converted e.g. to a percentage value, for output.

In this way, the image processing apparatus 1 is able to provide, for output to the user, a clear indication of the veracity of a captured image as it is captured and stored. Implementations of the present disclosure provide a real-time image verification process which operates within the camera system itself in order to counter injection based attacks at the camera buffer. The computational requirements to spoof the verification process are generally unfeasible at this point in time, while the verification process itself is computationally lightweight and is therefore particularly suited for execution on a mobile device. Furthermore, the image verification process disclosed herein can provide a secure operation in which the spatial information is removed from the data and cannot be passed outside the system.

Examples of the image processing apparatus may be implemented as a compact or portable device, such as a camera or video camera, or alternatively may be implemented as a mobile device or mobile communications device, e.g. a mobile phone, tablet, PDA or similar. Other examples, may be implemented in an embedded system, or as a peripheral device or accessory to a separate standalone apparatus.

In an alternative implementation, an alternative colour distribution may be calculated for each image frame. For example, pixels may be rearranged or reordered according to hue and/or saturation to form a new arrangement of pixels. Other alternatives are possible which allow correlation between image frames while removing spatial information from the data.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the scope of the invention as defined by the appended claims.

The invention claimed is:

1. A computer implemented method for image verification, comprising:
    receiving, by a processor, a plurality of image frames, comprising at least one test frame and one or more control frames;
    mapping, by the processor, each image frame onto a hue-saturation color space;
    generating, based on the mapped image frames, a color distribution for each image frame;
    calculating, by the processor, a correlation between the color distributions generated for the at least one test frame and the one or more control frames; and
    generating, by the processor for output to a user, a verification output based on the calculated correlation.

2. The method of claim 1, wherein the color distribution is a color distribution histogram.

3. The method of claim 1, further comprising converting, by the processor, each image frame into a one-dimensional pixel stream.

4. The method of claim 1, wherein the at least one control frame comprises at least one lead frame preceding the test frame and at least one post frame following the test frame.

5. The method of claim 1, wherein the at least one control frame comprises four or more lead frames preceding the test frame and four or more post frames following the test frame.

6. The method of claim 1, further comprising applying, by the processor, an L2 normalization to each of the color distribution histograms.

7. The method of claim 1, wherein the correlation comprises at least one of a zero normalized cross-correlation, a Chi-squared statistic correlation, an intersection correlation, and a Bhattacharyya distance.

8. The method of claim 7, wherein the correlation is based on a cost function comprising a weighted combination of two or more of the zero-normalized cross-correlation, Chi-squared statistic correlation, intersection correlation, and Bhattacharyya distance.

9. The method of claim 1, wherein the verification output is generated based on a comparison of a first correlation, between the test frame and an immediately preceding control frame, and a second correlation, between the test frame and an immediately following control frame.

10. The method of claim 1, wherein generating the verification output comprises:
  determining, based on the comparison, whether the test frame is classified as matched or spoofed; and
  generating, for output to the user, a classification for the test frame.

11. The method of claim 10, wherein the determination is based on a value of the comparison exceeding a predetermined threshold.

12. The method of claim 11, wherein the predetermined threshold is 0.1.

13. An image capture apparatus comprising:
  an image capture module configured to generate one or more image frames; and
  a verification module comprising a processor configured to execute the method of claim 1.

14. A mobile device comprising the image capture apparatus of claim 13.

15. A non-transitory computer-readable storage medium, having instructions stored thereon that, when executed by a computing device, cause the computing device to perform operations, the operations comprising the method of claim 1.

16. A non-transitory computer-readable storage medium, having instructions stored thereon that, when executed by a computing device, cause the computing device to perform operations, the operations comprising:
  generating an image stream comprising a plurality of image frames, wherein each of the plurality of image frames is generated periodically at a predetermined rate;
  storing the plurality of image frames;
  performing a verification process on the plurality of image frames to determine whether one or more images in the plurality of image frames is spoofed;
  performing image processing on the one or more image frames, thereby generating one or more processed image frames; and
  sending the one or more processed image frames to a user interface for output to a user.

17. The non-transitory computer-readable storage medium of claim 16, wherein the performing the verification process further comprises:
  converting the plurality of image frames from a first color space to a second color space, thereby generating a plurality of altered image frames;
  converting each of the plurality of altered image frames from a two-dimensional image into a one-dimensional pixel stream;
  generating a color distribution from the one-dimensional pixel stream for each of the plurality of altered image frames, wherein the color distribution is a histogram that comprises a two-dimensional array of bins corresponding to each value of hue and saturation; and
  generating a unique fingerprint corresponding to the color distributions.

18. The non-transitory computer-readable storage medium of claim 17, wherein the first color space is a red-green-blue (RGB) color space and the second color space is either a hue-saturation-value (HSV) color space or a hue-saturation-lightness (HSL) color space.

19. The non-transitory computer-readable storage medium of claim 17, wherein the converting each of the plurality of altered image frames is achieved by concatenating each row of each of the plurality of altered image frames in sequence on to the one-dimensional pixel stream.

20. The non-transitory computer-readable storage medium of claim 16, wherein the performing the image processing further comprises:
  scaling to increase or decrease a resolution of the one or more image frames; and/or
  adjusting a color of the one or more image frames.

* * * * *